April 2, 1940. L. STIFTER ET AL 2,195,525
ADJUSTABLE WIRE SCREW HOLDER
Filed Sept. 26, 1938
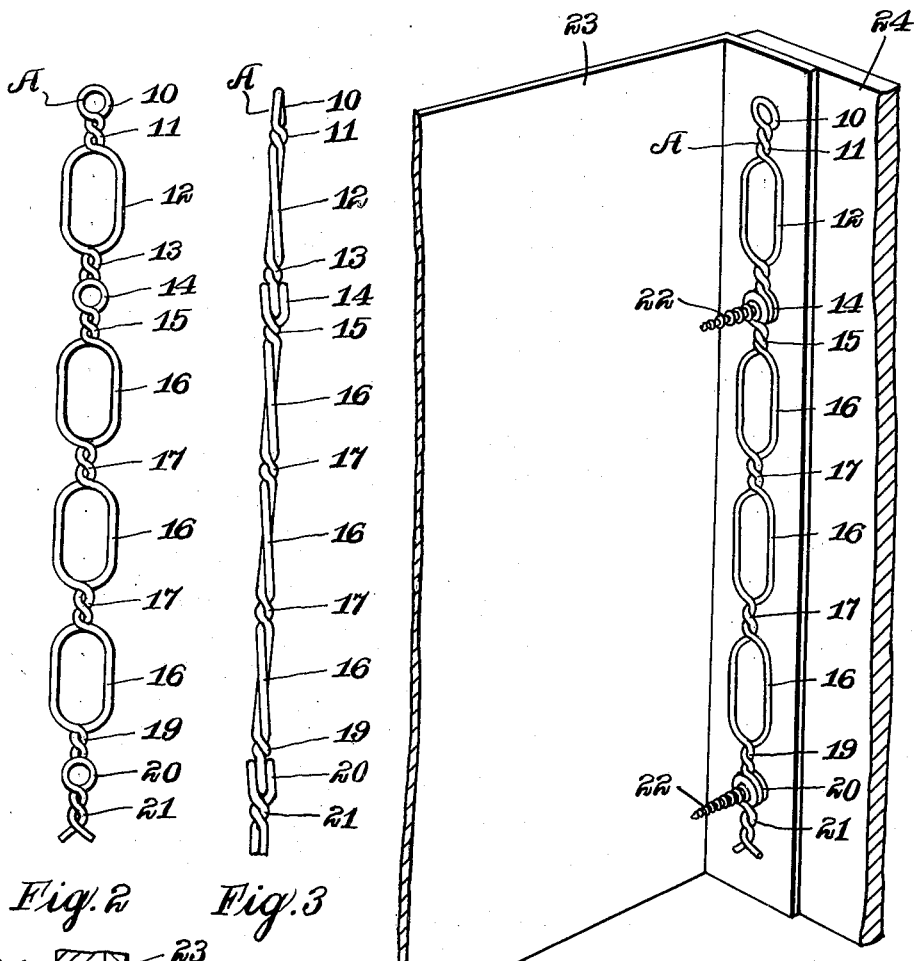
Fig. 1
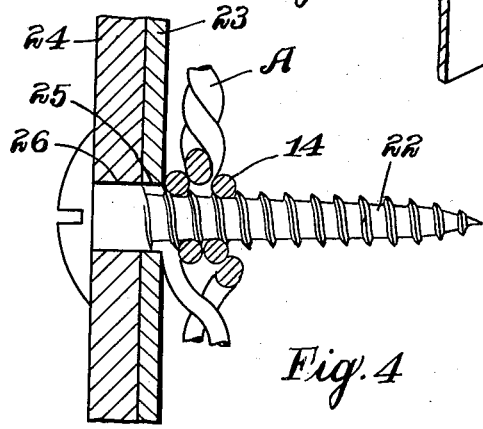
Fig. 2  Fig. 3
Fig. 4
Inventor
Louis Stifter
Enoch Swedman
By Howard L. Fischer
Attorney Patented Apr. 2, 1940

2,195,525

UNITED STATES PATENT OFFICE 2,195,525

ADJUSTABLE WIRE SCREW HOLDER

Louis Stifter and Enoch Swedman, St. Paul, Minn., assignors to Seeger Refrigerator Company, St. Paul, Minn., a corporation of Minnesota Application September 26, 1938, Serial No. 231,668

4 Claims. (Cl. 85—32.1)

Our invention relates to an improvement in an adjustable screw holder wherein it is desired to provide a means for holding screws firmly in position. In the manufacture of various devices, such as automobiles, electric refrigerators, and other objects in which relatively thin sheets of metal are used, it has been usual practice to provide reinforcing means containing a series of tapping holes into which bolts may extend in fastening two pieces of the device together. In recent years the use of self-tapping screws has become popular, but these screws are likely to not fit properly after they have once been removed and have the further disadvantage of not being strong enough to support any great amount of pressure. The self-tapping screws can only be used with metal up to a certain thickness, as beyond this thickness the screws are injured during the insertion thereof and the threads thereupon are stripped. If a firmer joint is desired, it has been necessary to use bolts which engage a tapped opening in a suitable nut or in a suitable reinforcing member overlying the sheets of metal to be attached.

It is the object of the present invention to provide a device whereby ordinary wood screws or the like may be used to fasten two members together. This screw extends into a suitable holding means formed of wire or similar material, in such a way that the threads of the screw firmly engage in the holder with as much strength as may be obtained through the use of a bolt of similar diameter. This construction enables us to detachably secure two sheets together by wood screws which are not injured by the insertion or removal into the holding means and which therefore may be used again after they have once been removed.

It is the object of the present invention to provide a holding means formed of wire or similar material and embodying a series of connected loops having spirally wound wire portions at suitable intervals. The spirally wound portions are so arranged that they cannot readily unwind and so that pressure upon this portion of the device merely tightens the spiral winding against the screws. Furthermore, the loop formation of the holding device enables the spiral portions thereof to be spread farther apart or moved closer together so as to engage screws which may not be placed with great accuracy.

In other words, our invention enables two members to be securely fastened together by merely drilling holes at intervals, inserting ordinary wood screws through these holes, and screwing the screws through spirally wound portions in a wire holding member. The wire holding member is stretched apart or compressed together so that the spirally wound portions correspond with the drilled openings through the members to be secured together. As the ordinary wood screw is formed with deep threads, the spirally wound portions of our holding member may extend deeply into these threads and firmly engage the screw. Thus it is virtually impossible for the screw to be pulled out while in engagement with this spiral winding, although the screw may be screwed out of contact therewith without injury either to the holding device or to the screw.

It is a further feature of our invention to provide a wire screw holder formed of wire of proper diameter to fit into the threads of a screw of predetermined size. If the wire is of the proper gauge, this wire may fit firmly into the thread of the screw and engage the screw throughout approximately half its area.

These and other objects and novel features of our invention will be more clearly and fully set forth in the following specification and claims.

In the drawing forming a part of our specification:

Figure 1 is a perspective view of a joint between two flat members illustrating the use of our wire screw holder.

Figure 2 is a front elevation view of our screw holder in readiness for use.

Figure 3 is a side elevation view of a portion of our screw holder.

Figure 4 is a cross-sectional view through the spirally wound portion of our screw holder, shown in engagement with a screw.

The wire holder A may be formed of a single length of wire or similar material as shown. This wire is centrally bent into a loop 10 and twisted together at 11. An enlarged loop 12 of wire is then provided to permit the holder to be shortened or lengthened at will. The wire is then twisted together at 13 and bent into a spirally wound portion 14. Each end of the wire twisted at 13 forms approximately one and one-half turns of the spiral winding 14, one end of the wire entering the central loop of the spiral winding and being twisted in one direction, while the other end of the wire enters the center loop of the spiral coil and is twisted in the opposite direction. The ends of the wire extending out from the outer coils of the spiral winding 14 are then twisted together at 15 and form another spacing loop 16 similar to the loop 12. If desired, several loops 16 may be formed in succession with the wires twisted together as at 17 between these adjacent loops 16. At the end of the succession of loops 16, the wire is twisted together as at 19 and the ends of the wire again are formed into the central loop of a spiral winding 20, identical with the winding 14. The ends of the wire are twisted from the central loop outwardly in both directions, the ends of the wire being twisted together as at 21. Adjacent the twisted connection 21 another succession of loops 16 may be provided and the wire holder A may extend to any desired length.

Obviously the loops 16 are for spacing purposes and the open loops permit the distance between the spiral coils or windings 14 and 20 to be varied. Any desired number of loops 16 may be provided between successive spiral coils or a single loop 16 may separate these coils. It will be seen that longitudinal pull on the holding means will act to tighten the spiral coils, therefore, even more securely engaging the screw such as 22 engaged in a spiral winding.

In operation the screw such as 22 may be extended through aligned openings in a pair of members 23 and 24 which are attached together and may be screwed into one of the spiral windings, such as 14 or 20. The spiral shape of the winding fits the spiral thread in the screw and the wire from which the holding means A is formed is of proper gauge to engage into the thread of the screw a maximum distance. It will be seen from Figure 4 of the drawing, that almost one-half of the circumference of the portion of the coil engaging the screw is in contact with the screw, and thus the screw is held with virtually the same degree of security that is provided by the usual nut engaging a bolt of the same diameter. The pointed end on the screw makes the same very easily inserted into the spiral windings and the assembly of the two parts 23 and 24 may be accomplished in a minimum of time. Any inaccuracy in the spacing of the holes 25 and 26 through the members 23 and 24 may be compensated for by slightly stretching or compressing the holding means A.

In accordance with the patent statutes we have described the principles of construction and operation of our wire screw holding device, and while we have endeavored to set forth the best embodiments thereof, we desire to have it understood that this is only illustrative of a means of carrying out our invention and that obvious changes may be made within the scope of the following claims without departing from the spirit of our invention.

We claim:

1. A wire screw holder comprising a pair of wire members; spiral coil means formed thereby of a diameter to threadably engage a screw; and loops interposed between said spiral coil means to hold said coil means in spaced relationship.

2. A wire screw holder comprising a pair of wire members twisted together at intervals to provide a screw engaging means engageable into the threads of a screw; said screw engaging means being of a diameter to retain the screw threaded thereinto, said wires forming loop means between said screw engaging portions.

3. An adjustable wire screw holder comprising a pair of wire members of proper thickness to engage firmly within the threads of screws of a predetermined size; a series of spiral coils formed by said wire through which the screws may be threaded; and loop means formed by said wire members between said coils, spacing said coils apart.

4. A screw holder comprising a series of spiral coils of a diameter to threadably engage the screws and deformable variable spacing means connecting said coils, said variable spacing means being formed of deformable material which may be deformed a greater or lesser amount to vary the effective distance between adjacent coils.

LOUIS STIFTER.
ENOCH SWEDMAN.